(12) United States Patent
Eisenberg et al.

(10) Patent No.: US 6,742,932 B2
(45) Date of Patent: Jun. 1, 2004

(54) AXLE BOLT

(75) Inventors: Mark H. Eisenberg, West Bloomfield, MI (US); Walter Potoczny, Royal Oak, MI (US)

(73) Assignee: CTS, Inc., Madison Heights, MI (US)

( * ) Notice: Subject to any disclaimer, the term of this patent is extended or adjusted under 35 U.S.C. 154(b) by 61 days.

(21) Appl. No.: 10/313,145

(22) Filed: Dec. 6, 2002

(65) Prior Publication Data

US 2003/0081869 A1 May 1, 2003

Related U.S. Application Data

(63) Continuation-in-part of application No. 09/506,669, filed on Feb. 17, 2000.

(51) Int. Cl.$^7$ ............................................. F16C 33/10
(52) U.S. Cl. ................. 384/396; 384/462; 411/395; 184/5.1; 29/890.12; 29/890.13
(58) Field of Search ................. 384/396, 462, 384/466, 477; 411/382, 395, 428; 184/105.3, 5.1; 29/890.12, 890.122, 890.13, 890.132

(56) References Cited

U.S. PATENT DOCUMENTS

| 1,054,015 | A | 2/1913 | McGahee |
| 1,980,123 | A | 11/1934 | Weber ........................ 384/474 |
| 2,088,148 | A | 7/1937 | Wilson ........................ 384/396 |
| 2,210,107 | A | 8/1940 | Thomas et al. ........... 29/890.132 |
| 2,254,503 | A | 9/1941 | Thomas et al. ............... 29/898 |
| 2,566,322 | A | 9/1951 | Flowers ....................... 384/477 |
| 2,788,221 | A | 4/1957 | Pritchard .................... 384/396 |
| 3,553,765 | A | 1/1971 | Frost ............................ 105/154 |
| 4,509,869 | A | 4/1985 | Johnston |
| 4,549,822 | A | 10/1985 | Crates |
| 4,597,679 | A | 7/1986 | Wlodkowski |
| 4,643,593 | A | 2/1987 | Gaffal et al. |
| 4,712,442 | A | 12/1987 | Baika et al. |
| 4,784,500 | A | 11/1988 | Prokop |
| 4,820,061 | A | 4/1989 | Dolfsma et al. |
| 4,881,829 | A | 11/1989 | Koelsch |
| 4,883,368 | A | 11/1989 | Stein |
| 4,928,795 | A | 5/1990 | Maloney |
| 4,952,077 | A | 8/1990 | Kurt |
| 4,968,157 | A | 11/1990 | Chiba |
| 5,007,747 | A | 4/1991 | Takeuchi et al. |
| 5,028,058 | A | 7/1991 | Olson |
| 5,106,209 | A | 4/1992 | Atkinson et al. |
| 5,183,342 | A | 2/1993 | Daiber et al. |
| 5,232,291 | A | 8/1993 | Kuan |
| 5,312,192 | A | 5/1994 | Shimuzu et al. |
| 5,322,373 | A | 6/1994 | Oakes et al. |
| 5,484,212 | A | 1/1996 | Guaraldi et al. |
| 5,490,730 | A | 2/1996 | Akita et al. .................. 384/902 |
| 5,493,833 | A | 2/1996 | Irimies ........................ 411/501 |
| 5,568,984 | A | 10/1996 | Williams |
| 5,577,847 | A | 11/1996 | Nakamura et al. |
| 5,826,986 | A | 10/1998 | Adkins et al. |
| 5,853,227 | A | 12/1998 | Schmidt, III |
| 5,906,047 | A | 5/1999 | Miller et al. ............ 29/890.132 |

FOREIGN PATENT DOCUMENTS

| DE | 31 32 575 A1 | 3/1983 | |
| GB | 123706 A | 6/1919 | ................ 384/396 |

Primary Examiner—William C. Joyce
(74) Attorney, Agent, or Firm—Gifford, Krass, Groh, Sprinkle, Anderson & Citkowski, PC

(57) ABSTRACT

An axle bolt has a shaft with a pair of opposed ends. An axle passage extends within the shaft and a transverse passage extends radially outwardly from the axial passage. A head attached to one end of the shaft has an outer face. A recess extends in from the outer face and the bottom of the recess is in communication with the axial passage. A lubrication fitting in the recess has one end in communication with the bottom of the recess and another end designed to be connected to a lubrication device. The recess in the bolt head is sufficiently deep that the second end of the lubrication fitting is within the recess and does not extend beyond the outer face.

8 Claims, 1 Drawing Sheet

AXLE BOLT

REFERENCE TO RELATED APPLICATIONS

This application is a continuation-in-part of U.S. patent application Ser. No. 09/506,669, filed Feb. 17, 2000, the entire contents of which is incorporated herein by reference.

FIELD OF THE INVENTION

The present invention relates to an axle bolt to rotatably mount a wheel or the like to an axle, which includes means for lubricating the bearings which rotatably support the wheel.

BACKGROUND

There are a number of arrangements for lubricating bearings for wheels or other rotating parts, but most are complicated and require structures other than that needed to accomplish the rotatable movement between a shaft and the wheel or the like.

Previous axle bolts have been provided which include an axle passage for the necessary lubricant and a transverse passage connected to the axle passage to direct the lubricant to a bearing mounted outwardly of the axle bolt. Fittings have been provided to receive the lubricant and to prevent it from flowing out of the axle passage before being delivered to the transverse passage.

A problem heretofore associated with such prior art axle bolts has been that the fittings had a tendency to be loosened and even broken off during use of the axle bolt. When that happens the fitting must be tightened or replaced before the axle bolt can be used to lubricate the bearing.

SUMMARY OF THE INVENTION

The present invention provides a simple means for permitting lubrication of the bearings without requiring additional and complicating structures. Close tolerances are provided between the fitting and the hole formed in the axle bolt to receive the fitting. This as well as the means provided to protect the fitting mounted to the axle bolt prevent it from being loosened or broken.

This is accomplished by providing an axial passage in the axle bolt which communicates with a lubrication fitting such as a ZERK grease fitting in the cap of the axle bolt and with a transverse passage at the end opposite the ZERK grease fitting. The ZERK grease fitting is mounted in a conical recess formed in the head of the bolt. In this way it is protected and the danger of it being accidentally loosened or broken is substantially diminished.

Lubrication provided at the ZERK grease fitting is transmitted through the axial passage to the transverse passage to the exterior of the axle bolt to lubricate the bearings or the like carried by the axle bolt.

BRIEF DESCRIPTION OF THE DRAWINGS

A better understanding of the present invention can be had by referring to the included drawings which illustrate a preferred embodiment of the present invention in which.

DETAILED DESCRIPTION OF THE PREFERRED EMBODIMENTS

Figure 1:
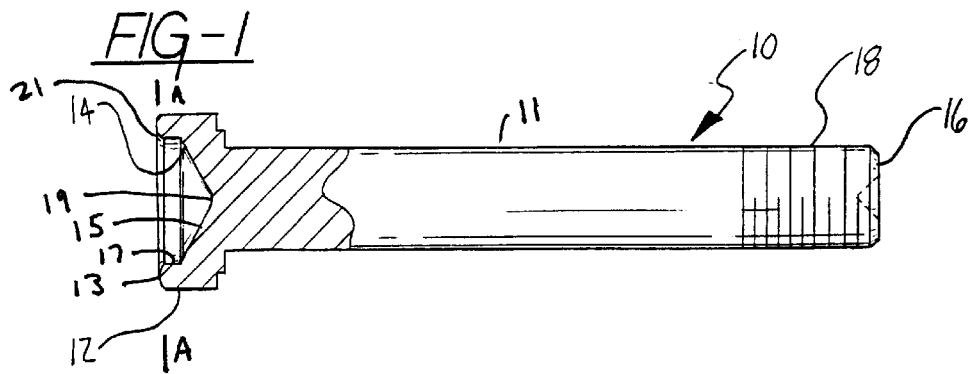
FIG. 1 is an elevational side view of a bolt according to the present invention as initially formed, with the upper portion of the bolt partially cut away to show the recess formed in the head.

As can best be seen in FIG. 1, the axle bolt 10 of the present invention is formed by forming a bolt 10 with a head 12 and a recess 14 formed in the head 12. As shown, the head 12 has an end face 13 which defines a plane A—A. The recess 14 extends into the head 12 from this end face 13. The recess 14 is preferably cold formed rather than drilled. The end 16 of the bolt 10 opposite the head 12 is then externally threaded as shown at 18.

The recess 14 may be said to be generally a conical recess. The conical recess 14 has a tapered or a conical bottom surface 15 and a sidewall 17 that extends from the tapered or conical bottom surface 15 to where the recess 14 joins the end face 13 of the bolt 10. Preferably, the bottom surface 15 is tapered or conical across the entire width of the recess 14. As shown, the tapered or conical bottom surface 15 is symmetrical with respect to the central axis of the bolt 10 and has a central "low point" 19. The low point 19 is the portion of the bottom surface 15 farthest from the end face 13. As shown, the edge at which the sidewall 17 joins the end face 13 is preferably a non-square edge 21. That is, the transition between the sidewall 17 and the end face 13 is not a 90 degree square corner, but is instead relieved, such as by being radiused or tapered.

Figure 2:
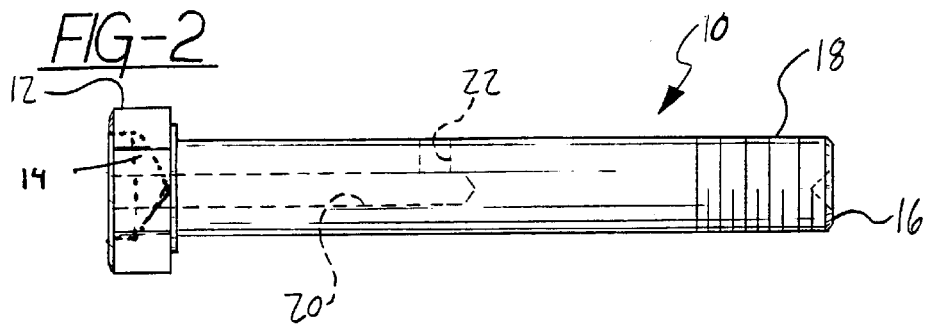
FIG. 2 is an elevational side view of the bolt of FIG. 1 with axial and transverse lubrication passages added.

FIG. 2 shows the axle bolt 10 formed with an axial passage 20 which extends from the recess 14 partially along the length of the shaft 11 of the bolt 10. A transverse passage 22 extends radially from the axial passage 20 to provide communication between the axial passage 20 and the exterior of the axle bolt 10 at a point intermediate the ends of the bolt 10.

As mentioned previously, the recess 14 is preferably cold-formed rather than drilled. Traditionally, recesses in bolt heads, such as in the present invention, were formed by drilling the recess. While drilling may provide a recess with a tapered bottom surface, drilling adversely affects the material properties of the head and the surface finish in the recess. Drilling is also a time intensive process. According to the present invention, the recess is cold formed. Cold forming the recess requires tooling that is substantially more expensive than the tooling required for drilling the recess and has therefore not been previously used. Traditional cold forming of a recess would also result in a recess with a flat bottom surface, rather than a tapered bottom surface. The present invention provides the benefit of cold forming and the benefit of having a recess with a tapered bottom surface. The tapered bottom surface creates a central low point to make drilling the axial passage 20 much easier.

The conical or tapered bottom surface of the recess was a result of extensive development work. The tapered bottom surface leads to better metal flow during the cold forming step, which improves the speed of the process, the repeatability, and the strength of the part, as compared to a part formed with a flat bottom cold formed recess. In addition, the tapered or conical bottom surface creates a part wherein the metal is less brittle, with a more malleable surface, at the central low point where the axial passage 20 is drilled. If traditional cold forming was used to provide a recess in the head of the bolt for the present invention, a lower quality part would result. Also, the low point would be eliminated, thereby requiring the additional step of using a center punch to start the drill for drilling the axial passage 20. In addition, the central point would be more brittle, increasing tool wear and leading to a lower quality drilled hole, thereby hurting the performance of the part. Also, the repeatability, speed of the process and strength of the part would be compromised, as compared to the novel cold formed tapered bottom surface of the present invention. Another problem with drilling the recess is that drilling creates metal chips which must be cleaned out of the recess, and causes burrs, marks, inconsistency and heating. As one example, drilling will sometimes lead to hard spots in the material, which in turn adversely effects the subsequent drilling of the axial passage.

The use of cold forming to form the recess for the present invention with a tapered bottom surface has traditionally not been possible because the appropriate tooling was not available. The die used to form this recess is produced using electrical discharge machining (EDM), which has only recently become available. Traditional grinding and other die forming processes would not create a die suitable for producing the present invention.

As mentioned previously, the transition between the sidewall 17 of the recess 14 and the end face 13 is relieved, such as by being radiused or tapered. This is another benefit of cold forming a recess. The cold forming allows this otherwise sharp edge to be relieved during the cold forming step, without the necessity of an additional cutting step, such as would be required if the recess was drilled. When a recess is drilled, the edges are typically less sharp, which is undesirable to users.

Figure 3:
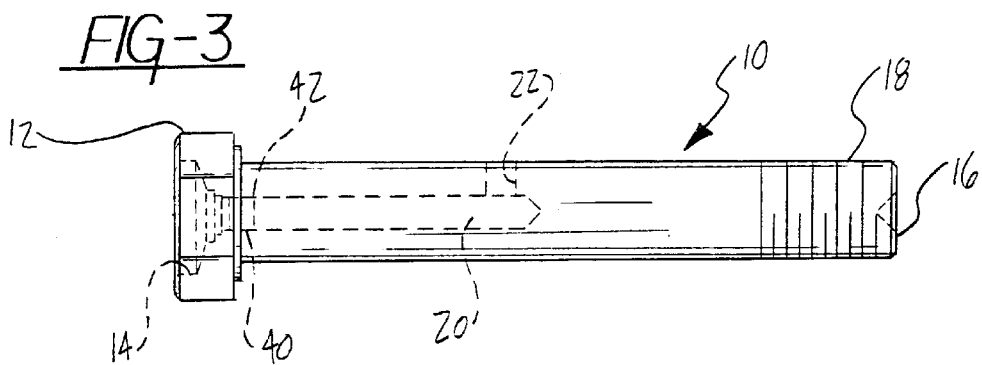
FIG. 3 is an elevational side view of the bolt of FIGS. 1 and 2 after the final machine step in which the axial passage has been cut to accept a grease fitting.

FIG. 3 illustrates a finished axle bolt 10. A fitting such as ZERK grease fitting 24 is mounted in the recess 14 and provides the means for providing lubricant to the passages 20 and 22.

Figure 4:
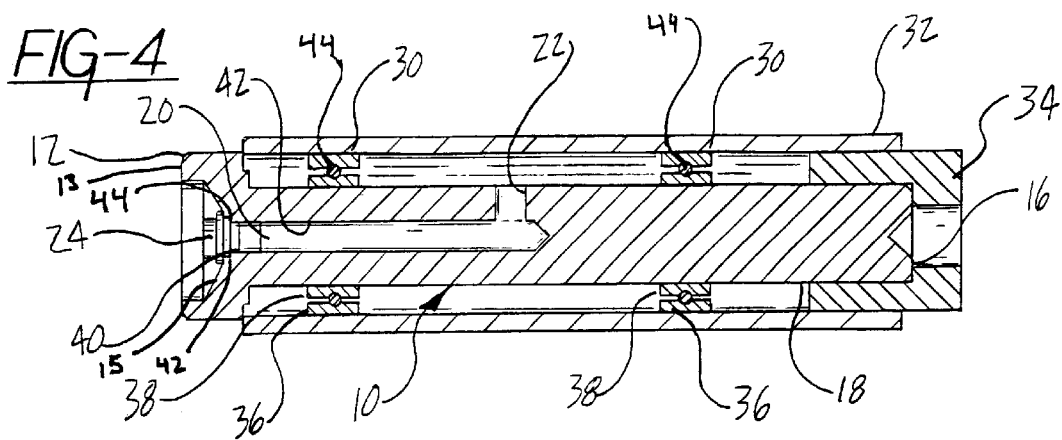
FIG. 4 is a longitudinal cross section of the axle bolt of the present invention in use.

As shown in FIG. 4, the ZERK grease fitting 24 is provided with an externally barbed portion 40 on one of its ends, which is driven into and received by an internal portion 42 formed at the entrance of the axial passage 20. When the fitting 24 is driven into the portion 42, the fitting 24 is tightly received in the head 12 of the axial bolt 10. As shown, the fitting 24 engages the conical bottom surface 15. Also, the fitting 24 is received in a protected position because it is within the conical recess 14. Close tolerances are maintained between the barbed portion 40 of the fitting 24 and the internal portion 42 to insure that the fitting 24 will be tightly mounted to the axle bolt 10. This new design provides the fitting a heavy duty power of 3000 psi. The end of the fitting 24 opposite the barbed portion is configured for connection to a lubrication device. The fitting 24 acts as a check valve and lets lubricant flow into the axial passage 20 but prevents it from flowing back out of the passage 20.

In addition to the above-discussed benefits of cold forming a recess with a tapered bottom surface, the combination of cold forming the recess with the tapered bottom surface, along with the use of a barbed grease fitting which is driven into a drilled hole at the bottom of the recess, contributes to the reliable and repeatable production of parts that can withstand high pressures. The traditional approach to providing a grease fitting that can withstand high pressures is to provide a threaded grease fitting and to thread the hole into which the grease fitting is received. This is undesirable in the present invention, as the threaded grease fittings will sometimes back out during use. In many cases, the grease fitting is lost and the entire axle bolt is replaced. A grease fitting that falls out is also unacceptable for clean or sterile environments such as hospitals and food service facilities. The fitting would introduce dirty grease and metal into the environment. In any environment, a grease fitting that has fallen out presents a tripping or falling hazard, since the small fitting may act like a small ball under a person's feet. A threaded grease fitting has the additional disadvantage that they require the additional step of threading the hole into which the grease fitting is received, which leads to increased part cost For the above reasons, it is important that a grease fitting, whether threaded or pressed in, does not fall out. It is also important for the fitting to withstand very high pressures, such as 3000 psi, without coming out. High grease injection pressures are used to force grease through the axle bolt and to the bearings. If the fitting comes loose when high pressure is applied, the axle bolt has to be replaced, and the fitting may present sanitary and safety issues. In order to interconnect the grease fitting with the entrance to the axial passage in such a way that it can withstand high pressures, such as 3,000 PSI, it is necessary to very closely control the tolerances on the hole into which the fitting is received. As discussed previously, cold forming the recess with the tapered bottom surface improves the material properties at the low point, where the hole is drilled. This, in turn, allows the axial passage to be drilled much more accurately and consistently, and for tolerances to be controlled. This also increases the useable life of the drill bit used to drill the axial passage, since the material through which it is drilling is more malleable and less brittle. If the recess 14 were instead drilled, the accuracy and repeatability of the drilled axial passage would be lower, making it much more difficult to provide a part that can withstand high pressures.

FIG. 4 illustrates the axle bolt 10 of the present invention in use. Bearings 30 rotatably support a hollow shaft 32 in a conventional manner. A cap nut 34 is received by the externally threaded portion 18 of the axle bolt 10 to retain the bolt 10 in position. The bearings 30 are provided with an outer half 36 and an inner half 38 as is conventional with the outer half 36 fixed to the shaft 32 and the inner half 38 fixed to the axle bolt 10. The shaft 32 can support a wheel (not shown) or the like for rotation about the axle bolt 10.

Ball bearings 44 or the like which are disposed between the outer halves 36 and the inner halves 38 of the bearings 30 require lubrication. In the present invention this is provided by introducing grease or other lubricant through the Zerk fitting 24 and into the axial passage 20. The lubricant will be forced from the axial passage through the transverse passage 22 and into the bearings 30.

It should be apparent that the present invention provides an axle bolt which has built into its construction means to provide lubrication to bearings or the like totally supported by the axle bolt. The lubrication is accomplished without the necessity of additional structure and the lubrication is provided directly to the bearings which require the lubrication.

It should also be apparent that unlike axle bolts of the prior art the fitting 24 does not extend beyond the end face of the head 12 of the bolt 10 so that there is little danger of being damaged or loosened during use. The recess 14 provides protection for the fitting but is large enough to permit the fitting 24 to be connected to a lubricating supply connection (not shown) of conventional construction.

It should be further apparent that the tight fitting between the fitting 24 and the axle bolt 10 provided by the close tolerances between the barbed projection 40 of the fitting 24 and the internal portion 42, as well as the heavy duty construction of the fitting 24, provides a construction which resists separation of the fitting 24 and the axle bolt 10.

It should also be apparent that changes and modifications can be made without departing from the spirit or teaching of the invention as set forth in the above description of a preferred embodiment of the invention.

We claim:

1. An axle bolt comprising:

an elongated body having a first end, a second end and an external surface;

an end cap integrally formed with the first end of the elongated body, the end cap having an end face defining a plane, the end face having a cold formed recess defined therein with a bottom surface spaced from the plane, the bottom surface of the recess being conically tapered with respect to the plane and having a central low spot that is furthest from the plane of the end face;

an axial passage defined in the bolt, the passage having an open end defined at the central low point of the bottom surface of the recess, the passage extending from the open end axially along the elongated body toward the second end, and terminating before the second end;

a transverse passage defined in the bolt, the transverse passage extending from the axial passage to the external surface of the elongated body;

a grease fitting having a generally cylindrically shaped engagement portion having a barbed projection defined thereon, the grease fitting being driven into the open end of the axial passage such that the engagement portion engages the open end of the axial passage;

wherein the conically tapered bottom surface of the recess extends radially away from the grease fitting so as to define substantially the entire width of the recess; and wherein the recess is sufficiently deep that the grease fitting does not extend beyond the plane of the end face.

2. The axle bolt according to claim 1, wherein the open end of the axial passage has a predetermined inside diameter and the barbed projection on the grease fitting has a predetermined outside diameter, the predetermined inside diameter and predetermined outside diameter being chosen such that once the grease fitting is driven into the open end of the axial passage, the fitting can withstand 3000 psi without becoming disengaged from the opening.

3. The axle bolt according to claim 1, wherein the cold formed recess further comprises a side wall extending between the bottom surface of the recess and the end face of the end cap, the transition between the side wall and the end face being a non-square edge.

4. The axle bolt according to claim 1, further comprising threads formed on the external surface of the elongated body at the second end.

5. An axle bolt comprising:

an elongated body having a first end, a second end and an external surface;

an end cap integrally formed with the first end of the elongated body, the end cap having an end face defining a plane, the end face having a cold formed recess defined therein with a bottom surface spaced from the plane, the bottom surface of the recess being conically tapered with respect to the plane and having a central low spot that is furthest from the plane of the end face, the recess further comprising a side wall extending between the bottom surface of the recess and the end face of the end cap, the transition between the side wall and the end face being a non-square edge;

an axial passage defined in the bolt, the passage having an open end defined at the central low point of the bottom surface of the recess, the passage extending from the open end axially along the elongated body toward the second end, and terminating before the second end, the open end of the passage having a predetermined inside diameter;

a transverse passage defined in the bolt, the transverse passage extending radially from the axial passage to the external surface of the elongated body;

a grease fitting having a generally cylindrically shaped engagement portion having a barbed projection defined thereon, the barbed projection having a predetermined outside diameter, the grease fitting being driven into the open end of the axial passage such that the engagement portion engages the open end of the axial passage;

wherein the predetermined inside diameter and predetermined outside diameter are chosen such that once the grease fitting is driven into the open end of the axial passage, the fitting can withstand 3000 psi without becoming disengaged from the opening;

wherein the conically tapered bottom surface of the recess extends radially away from the grease fitting so as to define substantially the entire width of the recess; and wherein the recess is sufficiently deep that the grease fitting does not extend beyond the plane of the end face.

6. A method of forming an axle bolt, comprising the steps of:

forming a bolt having an end cap and an elongated generally cylindrical body extending therefrom to a second end, the body having an external surface, the end cap having an end face defining a plane;

cold forming a recess in the end face of the end cap, the cold formed recess having a conically tapered bottom surface with a central low point that is furthest from the plane of the end face;

forming an axial passage having an open end defined at the central low point of the bottom surface of the cold formed recess and extending along the elongated body toward the second end and terminating before the second end;

forming a transverse passage extending radially between the axial passage and the external surface of the body;

providing a grease fitting having a generally cylindrically shaped engagement portion with a barbed projection defined thereon; and driving the engagement portion of the grease fitting into the open end of the axial passage such that the engagement portion engages the open end of the axial passage;

wherein after the engagement portion of the grease fitting is driven into the open end of the axial passage, the conically tapered bottom surface of the recess extends radially away from the grease fitting so as to define substantially the entire width of the recess.

7. The method according to claim 6, further comprising the step of forming threads on the external surface of the body.

8. The method according to claim 6, wherein the cold forming step further comprises cold forming the recess such that the recess has a side wall extending between the bottom surface of the recess and the end face of the end cap and the transition between the side wall and the end face is a non-square edge.

* * * * *